United States Patent Office.

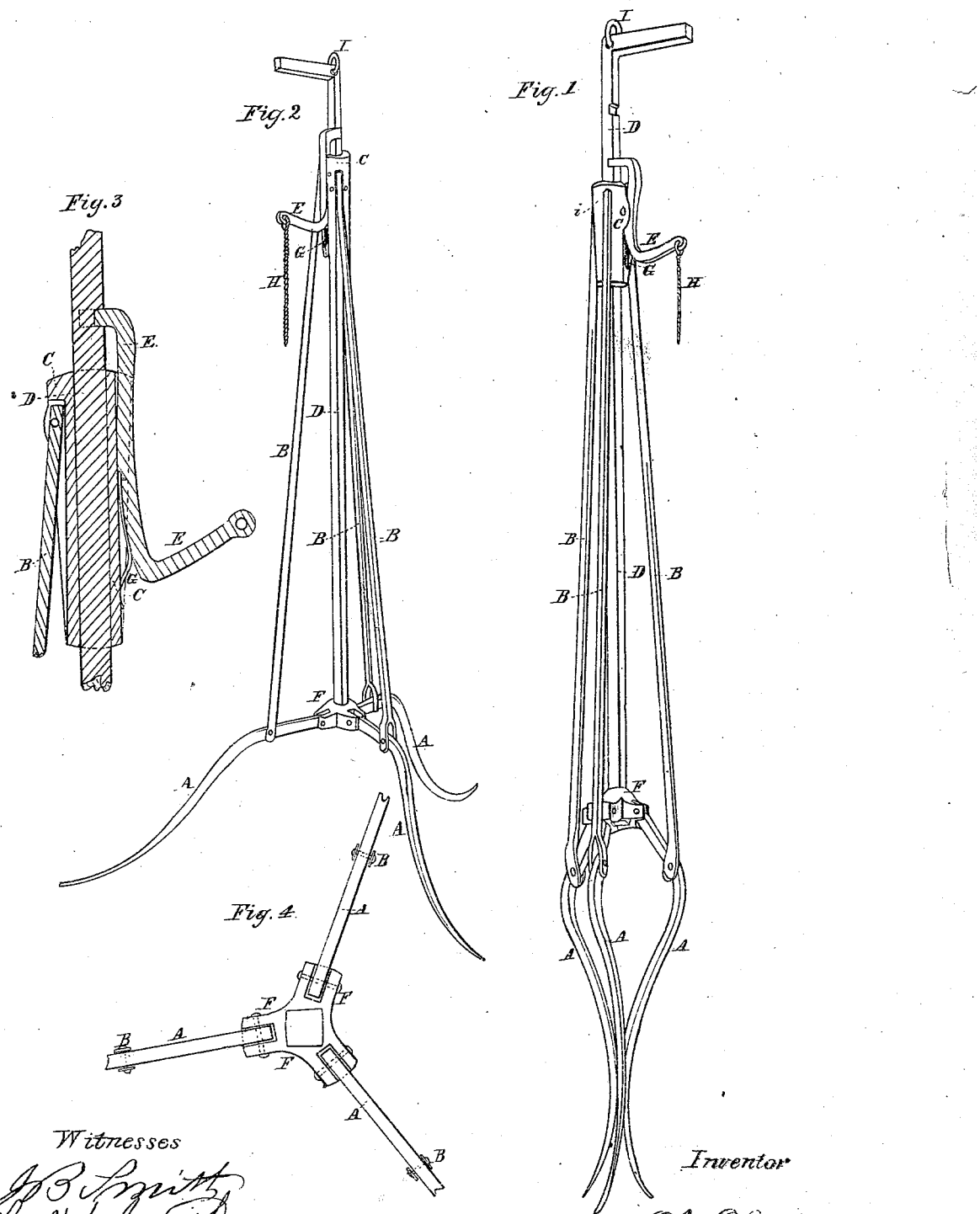

OLE O. STORLE, OF NORTH CAPE, ASSIGNOR TO HIMSELF AND PERCY B. SMITH, OF MILWAUKEE, WISCONSIN.

*Letters Patent No. 64,164, dated April 23, 1867.*

IMPROVEMENT IN HORSE HAY-FORKS.

*The Schedule referred to in these Letters Patent and making part of the same.*

TO ALL WHOM IT MAY CONCERN:

Be it known that I, OLE O. STORLE, of North Cape, in the county of Racine, and State of Wisconsin, have invented a new and useful Improvement in Horse Hay-Forks; and I do hereby declare that the following is a full, clear, and exact description of the construction and operation of the same, reference being had to the annexed drawings, making a part of this specification, in which—

Figure 1 is a view of the fork when ready for use.

Figure 2, a view of the fork when thrust into the hay to be raised.

Figure 3, a sectional view of the centre shaft, with the sleeve, to which is attached the prong connecting-rods; and Figure 4, the lower end of the centre-shaft prong-connections, with sections of the prongs or forks.

Similar letters of reference, in each of the figures, indicate corresponding parts.

To enable others skilled in the art to make and use my invention, I will proceed to describe its construction and operation.

A A A are the prongs of the fork; B B B, connecting-rods to the prongs; C, sleeve to which are attached the upper ends of the connecting-rods B; D, the centre-shaft, to which prongs A are attached and on which sleeve C slides; E, lock-catch, attached to sleeve C and hooking into a notch or over a projection in shaft D, to hold the prongs A expanded when loaded; F F F, the connecting joints of prongs A; G, a spring to hold lock E in place; H, rope attached to the handle of lock E, by which said lock is unhooked to allow prongs A to come together to be relieved of their load; I, an eye on the upper end of shaft D, into which is to be attached a rope with which to raise, lower, and operate the fork.

Operation.

The fork being in the position as shown in fig. 1, it is pressed down, the points of the prongs entering the hay, and as they enter it they are pressed apart till they assume the position shown at fig. 2; sleeve C sliding up shaft D till lock E hooks into the notch in the shaft, spring G throwing out its lower end and holding it firm in place, the fork is then raised by means of the rope attached to the eye, in the upper end of shaft D, when the hay upon the prongs A is raised, and when elevated and swung, by means of a crane or snag of the rope or otherwise, over the point where the hay is to be deposited, by means of rope H, lock-catch E is unhooked, the weight of the hay brings the prongs A together and the hay slides off, falling into the desired place, and the fork is ready to be used again.

What I claim as my invention, and desire to secure by Letters Patent, is—

A horse hay-fork, when made with prongs A, connecting-rods B, sleeve C, shaft D, and lock E, in combination, substantially as and for the purpose described.

OLE O. STORLE.

Witnesses:
J. B. SMITH,
CHAS. A. SMITH.